United States Patent [19]

Nettles

[11] Patent Number: 5,647,568
[45] Date of Patent: Jul. 15, 1997

[54] APPARATUS FOR RETAINING PLIABLE MATERIAL

[75] Inventor: Robert Nettles, Austin, Tex.

[73] Assignee: Brenco Leisure Products, Austin, Tex.

[21] Appl. No.: 345,640

[22] Filed: Nov. 23, 1994

[51] Int. Cl.$^6$ ............................................. A47G 1/10
[52] U.S. Cl. ................... 248/316.2; 248/316.7; 211/16
[58] Field of Search .................. 248/316.2, 316.7, 248/314, 534, 316.1, 309.1, 540, 541; 211/14, 16; 206/315.3, 315.5, 315.9

[56] References Cited

U.S. PATENT DOCUMENTS

| | | | |
|---|---|---|---|
| D. 339,496 | 9/1993 | Corcoran | D6/608 |
| 1,236,929 | 8/1917 | Hauck | 248/312 |
| 1,718,952 | 7/1929 | Fischer | 206/315.9 |
| 2,231,883 | 2/1941 | Caccivio | 24/244 |
| 2,377,488 | 6/1945 | Fugazzi | 211/45 |
| 2,939,195 | 6/1960 | Carlson | 24/245 |
| 3,159,281 | 12/1964 | Hutter et al. | 211/16 |
| 4,100,652 | 7/1978 | Carlson | 206/315.3 |
| 4,449,310 | 5/1984 | Kline | 40/11 R |
| 4,516,616 | 5/1985 | Fesler | 150/52 R |
| 4,595,126 | 6/1986 | Holmes | 222/105 |
| 4,688,304 | 8/1987 | Marcott | 24/459 |
| 4,850,483 | 7/1989 | Stack | 206/315.9 |
| 5,147,703 | 9/1992 | Provost et al. | 428/82 |
| 5,168,605 | 12/1992 | Bartlett | 24/519 |
| 5,332,090 | 7/1994 | Tucker | 206/315.3 |
| 5,411,237 | 5/1995 | Dougherty | 248/309.1 |

*Primary Examiner*—Derek J. Berger
*Assistant Examiner*—Anita M. King
*Attorney, Agent, or Firm*—H. Dale Langley, Jr.

[57] ABSTRACT

An apparatus for attaching a pliable material, such as a towel, to a more rigid structure, such as a golf bag, is disclosed. The apparatus includes a body. The body has a cylindrical, vertically disposed bore. The body of the apparatus is attached to the rigid structure. A ball of smaller diameter than the bore of the body is wrapped in the pliable material and forced into the bore. The pliable material is thereby wedged between the ball and the wall of the bore.

1 Claim, 3 Drawing Sheets

APPARATUS FOR RETAINING PLIABLE MATERIAL

BACKGROUND OF THE INVENTION

1. Field of the Invention

The invention relates generally to a device and method for securing a pliable material, such as a golf towel, to a structure, such as a golf bag, and, more particularly, relates to such a device and method which secures a pliable material by wedging the pliable material between an object and a bore hole shaped substantially like the object.

2. Description of the Related Art

There are many instances in which it is desirable to secure a pliable material, such as a cloth or sheet, with a rigid structure. A typical practice for securing such a pliable material with a rigid structure has been to incorporate a fitting, such as a grommet, with or in the pliable material. The fitting has been chosen in the past to particularly conform to an accepting protrusion or catch of the rigid structure. By connecting the fitting incorporated with the pliable material with the protrusion or catch, the connection secures the pliable material with the rigid structure, at least to the extent that the pliable material, the fitting and/or the rigid structure are sufficiently strong to withstand forces which may be applied to the pliable material.

Another typical practice employed in some instances has been to attach a pliable material directly with a rigid structure to secure the pliable material with the structure. In those instances, a tack to the rigid structure or a protrusion from the rigid structure may pass through the pliable material directly, not within a fitting thereof. The tack or protrusion through the pliable material then itself maintains the attachment of the pliable material with the structure.

In each of these typical practices, the attachment strength of the pliable material to the rigid structure will vary depending upon the pliable material strength and the particular mechanism employed for the attachment. The pliable material strength may vary in any instance depending upon a number of factors. Those factors may include the overall shear strength of the pliable material. Alternatively or additionally, if the pliable material is a fibrous weave, e.g., a towel or other cloth, the attachment strength of the pliable material with the rigid structure may depend both upon the shear strength of the fibers and upon the separation strength of the particular weave of the fibers. That shear strength and separation strength may itself depend upon a number of factors, including, for example, the particular fiber material forming the weave, the age and condition of the particular material of the weave, the environmental conditions to which the material is and has been subjected, and numerous other factors characteristic of the pliable material or the application.

In the situation in which a pliable material is incorporated with a fitting, the fitting may tear from the pliable material when excessive force tears the pliable material from the rigid structure. When no fitting is incorporated in the pliable material, the pliable material may tear from a protrusion or tack, or even because of the protrusion or tack, of the rigid structure when an excessive force is applied to the pliable material directed away from the structure. In each event, the strength of the attachment will depend upon the shear and separation strength of the particular arrangement and the materials and application involved.

The present invention overcomes problems of the prior art attachment methods and apparatus. The invention does so by providing devices and methods which may more evenly distribute along a pliable material any forces that would otherwise yield shear and separation tears of the material. The invention also overcomes the prior problems because the stress points along the pliable material at which shear and separation forces may be directed because of the attachment may be located at varying select locations of the pliable material by varying the attachment point. As hereinafter fully described, the present invention provides significant advantages in these respects as well as others.

A particularly suitable application of the present invention is in the attachment of a golf towel to a golf club bag. Previously, golfers have been known to desire a towel or other cloth material of approximately the size of a hand towel at various times while playing a round of golf. Players may use such towel or cloth to dry their hands, to rough up grips of golf clubs, to polish dirt or grime from wood or iron golf club heads, to dry the players brow, and for many other purposes. As might be expected, a golfer is apt to lose a towel during a round of play if the towel is not in some manner secured with the player or with matters carried by the player which are not easily lost. Thus, a practice employed by golfers has been to attach a golf towel to a golf bag which is carried by a player for containing golf clubs and other accessories.

A golfer may employ a variety of means and mechanisms to attach a towel to a golf club bag or other golfing accessory carried by the golfer during play. In the prior technology, players have typically either attached a towel directly with a protrusion or appendage of a golf bag or other rigid structure carried by the golfer, or they have incorporated a towel with a fitting, such as, for example, a grommet, which fits on such a protrusion or appendage. In each instance, the towel may be subjected to various forces. For example, a player may pull on the towel attached to the bag when drying the player's hands. Also, the towel may catch on a ridge or edge when the golf bag is being transported, thereby pulling the towel at its attachment to the bag. Numerous other possibilities and situations arise.

In all these possibilities and situations, the golf towel is subject to tearing either from the fitting becoming separated from the towel or, where no fitting, by the towel becoming separated from the protrusion or appendage of the rigid structure. That tearing of the towel can result because of forces applied to the towel directed away from the bag attachment which exceeds the shear strength of the towel fibers and/or the separation strength of the particular weave. Given that certain golf towels may be pricey and often are treasured mementos of players, golfers generally wish to retain towels without tearing, rather than have towels tear and become lost when pulled from securement with the golfer or the golfer's appurtenances.

As is well apparent, it would be an improvement in the art to provide a golf towel and/or attachment mechanisms for such a towel that would reduce the chances of tear and separation from attachment with a golf bag or other golfing accessory carried by the golfer. Such an improvement, if suitable for use in all instances of golf towels, whether or not the towels are incorporated with specialized fittings (such as, for example, grommets) or other special mechanisms or means for attachment, would be valuable to golfers and would provide many advantages which are not realized with present golf towels and related retention and attachment equipment.

The present invention overcomes the problems of limited shear and separation strength of pliable materials, such as golf towels, and resulting tear and separation from attachment thereof, by presenting a new and improved apparatus and method for attaching a pliable material to a rigid structure. As will be appreciated by those skilled in the art, the invention is particularly applicable and suitable in the case of a golf towel to be secured with a golf bag or other structure maintained by and with a golfer during play. The invention, however, is not limited to such applications and has many additional advantages and applications in and to any circumstance in which a pliable material is affixed with a more rigid structure, wherein a sufficient strength of such affixation is important and desirable. Therefore, though the background of the invention herein has been described, in part, with respect to application to a golf towel and golf bag, the invention has other and varied applications and use, all of which will be hereinafter more fully apparent.

SUMMARY OF THE INVENTION

One embodiment of the invention is an attachment device for securing a pliable material with a rigid structure. The device comprises means for attaching to the rigid structure, means for holding the pliable material, and a body, connecting the means for attaching and the means for holding.

In another aspect, the means for holding comprises a receptacle formed of the body and means for inserting into the receptacle to wedge the pliable material in contact with the receptacle.

In yet another aspect, the body incorporates the means for attaching and the means for holding.

In even another aspect, the means for attaching comprises a clip.

In a further aspect, the means for attaching comprises at least one screw.

In yet a further aspect, the means for attaching comprises means for forming the body as part of the rigid structure.

Another embodiment of the invention is an apparatus for securing a pliable material with a rigid structure. The apparatus comprises a container having an internal bore of an inside diameter, means for attaching the container to the rigid structure, and a ball, of smaller diameter than the inside diameter, the ball being partially wrapped with the pliable material and placed into the internal bore to wedge the pliable material via the ball against the container within the internal bore.

In another aspect, the container is cylindrical and the internal bore is cylindrical within the container.

In even another aspect, the container includes a circumferentially disposed expansion slot extending longitudinally along the container.

In yet another aspect, the container is sufficiently expansive to allow the ball wrapped with the pliable material to be inserted into the internal bore in order to wedge the pliable material via the ball against the container within the internal bore.

In a further aspect, the container terminates in a bottom which plugs the internal bore preventing longitudinal passage of the ball entirely through the internal bore of the container.

Yet another embodiment of the invention is an apparatus for attaching a towel to a golf bag. The apparatus comprises a body having a cylindrical, vertically disposed bore, means for attaching the body to the golf bag, and a ball of smaller diameter than the bore, the ball being wrapped in the towel and forced into the bore wedging the towel between the ball and the bore.

In another aspect, the bore is plugged at a lower end to prevent the ball and the towel from passing vertically downward through the body.

In yet another aspect, the ball is attached with the body to allow restricted movement of the ball a limited radius from the body where attached.

In even another aspect, the body includes an expansion slot disposed vertically in the bore for allowing the bore to expand to allow passage into of and engagement of the towel wrapped around the ball with the bore.

In a further aspect, the ball and the towel may be removed from wedging with the bore via force applied vertically upward to the ball and the towel sufficient to overcome friction of the wedging.

A further embodiment of the invention is a method for securing a pliable material with a structure. The method comprises the steps of attaching a body to the rigid structure and wedging the pliable material within the body.

In another aspect, the step of wedging includes the steps of forming the body with a bore hole, wrapping the pliable material around a sphere having diameter slightly smaller than a diameter of the bore hole, and forcing the ball and the pliable material into the bore hole so that the towel becomes frictionally engaged between the sphere and the bore hole.

In even another aspect, the step of forming the body includes the step of providing the bore hole with capacity to expand to allow the ball and the pliable material to be wedged within the bore hole.

In a further aspect, the step of wedging may be reversed by a step of forcing the ball and the pliable material from the bore hole.

In another aspect, the pliable material is a towel and the structure is a golf bag and the method is suitable for securing the towel with the golf bag when in use.

BRIEF DESCRIPTION OF THE DRAWINGS

For a more complete understanding of the present invention, and for further objects and advantages thereof, reference may now be had to the following detailed description, taken in conjunction with the accompanying drawings, wherein.

DETAILED DESCRIPTION

In the following detailed description, reference is herein made to a golf towel and golf bag in connection with the description of the particular design, application, and use of the invention. Those references are intended for illustrative purposes only and should be considered as exemplary of one application, but not all possible applications, of the invention. The invention, thus, has varied application in any instance in which a pliable material is desired to be attached with a rigid structure in a manner which provides a high resistance from tear and separation of the pliable material from such attachment.

Figure 1:
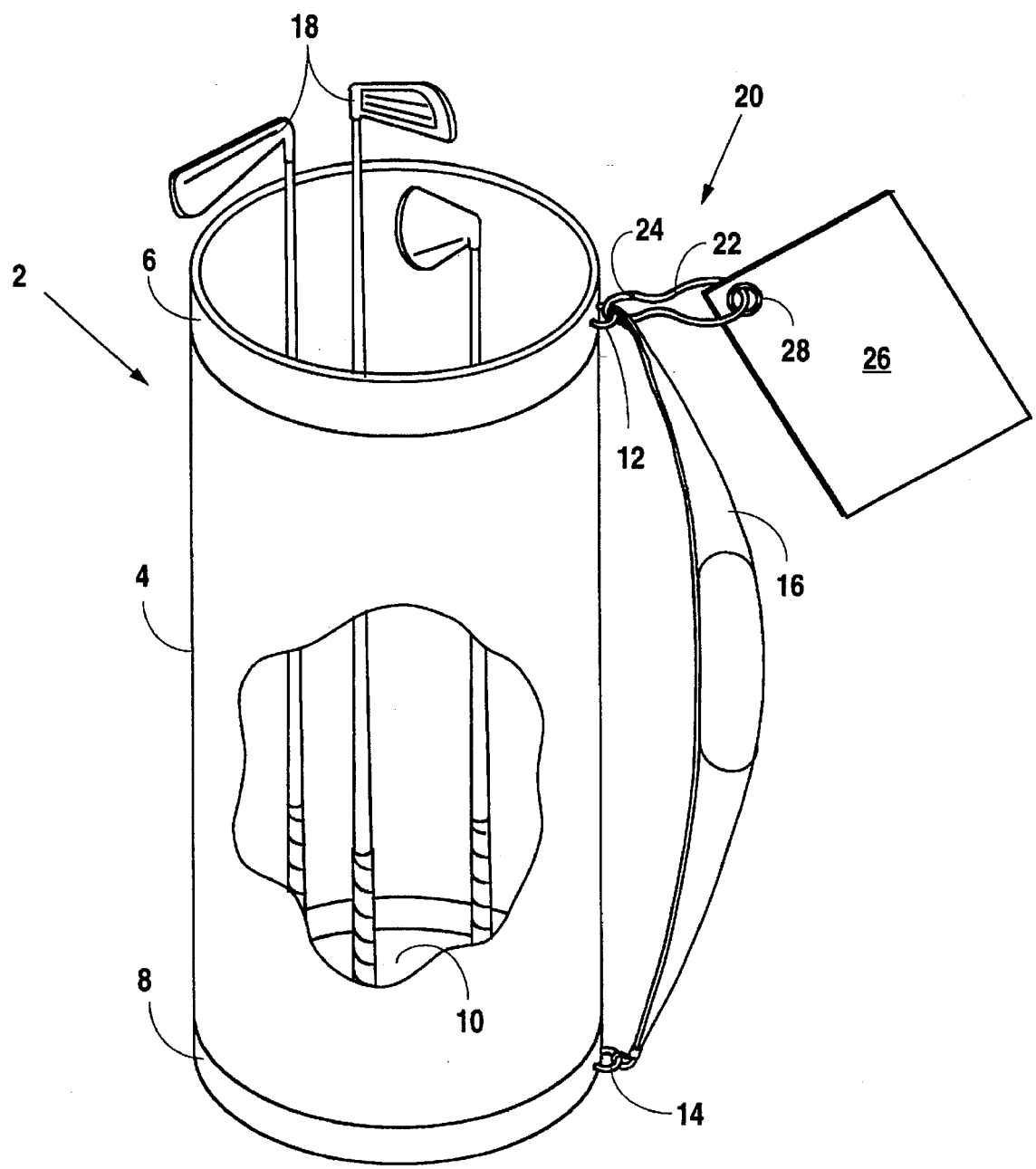
FIG. 1 is a perspective view of a prior art attachment apparatus for affixing a pliable material, e.g., a golf towel, with a rigid structure, e.g. a golf bag.

Referring first to FIG. 1, a typical golf club bag 2 is illustrated. The golf bag 2 generally consists of a shell 4 having an upper rim 6 and a lower rim 8. The shell 4 is open at the top to allow golf club 18 shafts to be placed within the shell 4. The bottom 10 of the shell is closed. Thus, when a golf club 18 shaft is lowered into the top of the shell 4, the golf club 18 shaft proceeds until it contacts the bottom 10 of the shell 4. The club 18 then rests within the shell 4 on the bottom 10. In this manner, transport of the golf bag 2 by a golfer provides a convenient means for carrying golf clubs 18 and other golf accessories and equipment.

Still referring to FIG. 1, the golf club bag 2 also includes an upper ring 12 and lower ring 14. Though illustrated here as rings 12, 14, any similar connecting device may be employed with a golf bag 2 and a variety of connecting devices are known in the art. The upper ring 12 and lower ring 14 illustrated here are, therefore, intended only as exemplary of the typical golf bag 2 configuration (and, as will be appreciated by those skilled in the art, the present invention is not dependent on this or any other particular configuration). To the upper ring 12 and lower ring 14 in this exemplary configuration is attached a carry strap 16. The carry strap 16 is typically attached to the upper ring 12 and lower ring 14 via some attachment mechanism, such as one or more rings, of the carry strap 16. This simplified description and explanation of the typical golf bag 2 is intended as exemplary only, as wide variation is possible and heretofore and presently exists in the varied configurations of golf bags available in the market. Those skilled in the art will readily understand and appreciate the significance of this particular example and of the numerous variations and will understand that the present invention may be suitable or adapted for use with any such configuration.

Continuing to refer to FIG. 1, an attachment clasp 20 of the prior technology is shown in conjunction with the golf bag 2. This prior assembly includes a clasp 22. The clasp 22 has been typically formed of a metal wire and has included a break 24. The break 24 allows for separation of the clasp 22 at the break 24 so that the clasp 22 may be passed through a protrusion, such as the upper ring 12 of the golf bag 2. Further, the break 24 of the clasp 22 may serve to allow connection of a golf towel, or attachment mechanism, as hereinafter more fully described.

Further still referring to FIG. 1, a towel 26 is shown. The towel 26 shown here is intended as exemplary of the typical golf towel often carried by golfers during play. Such a towel 26 has been formed of a wide variety of materials, such as, for example, cotton and synthetic cloths, and other materials. Such a towel 26 has, on occasion, been attached to a golf bag 2 via the clasp by passing the clasp, at its break 24, directly through the towel 26. Alternatively, such a towel 26 has on occasion included a grommet 28 incorporated therein through which the clasp 22 is passed to attach the towel 26 with the bag 2. Such a grommet 28 has typically been formed of a metal or plastic. When present, the grommet 28 allows for attachment of the towel 26 with the clasp 22 through the grommet 28. As was previously discussed, the grommet 28 has provided certain advantages in strengthening the attachment of the towel 26 with the golf bag 2 because separation and tear strength of the towel 26 is increased somewhat because of use of the grommet 28. Notwithstanding, however, that such a grommet 28 may provide increased separation and tear strength to the attachment of the towel 28 via the clasp 22, the grommet 28 may (and has been known to) separate from the towel 26 if the towel 26 is worn at the grommet 28, if excessive force is directed to tear the towel 26 from its attachment with the golf bag 2, and in other circumstances and scenarios. The present invention helps prevent loss of a pliable material, such as a towel 26, when attached with a rigid structure, such as a golf bag 2, by dispensing with the use of a grommet 28 or other prior attachment means in providing for the attachment.

Figure 2:
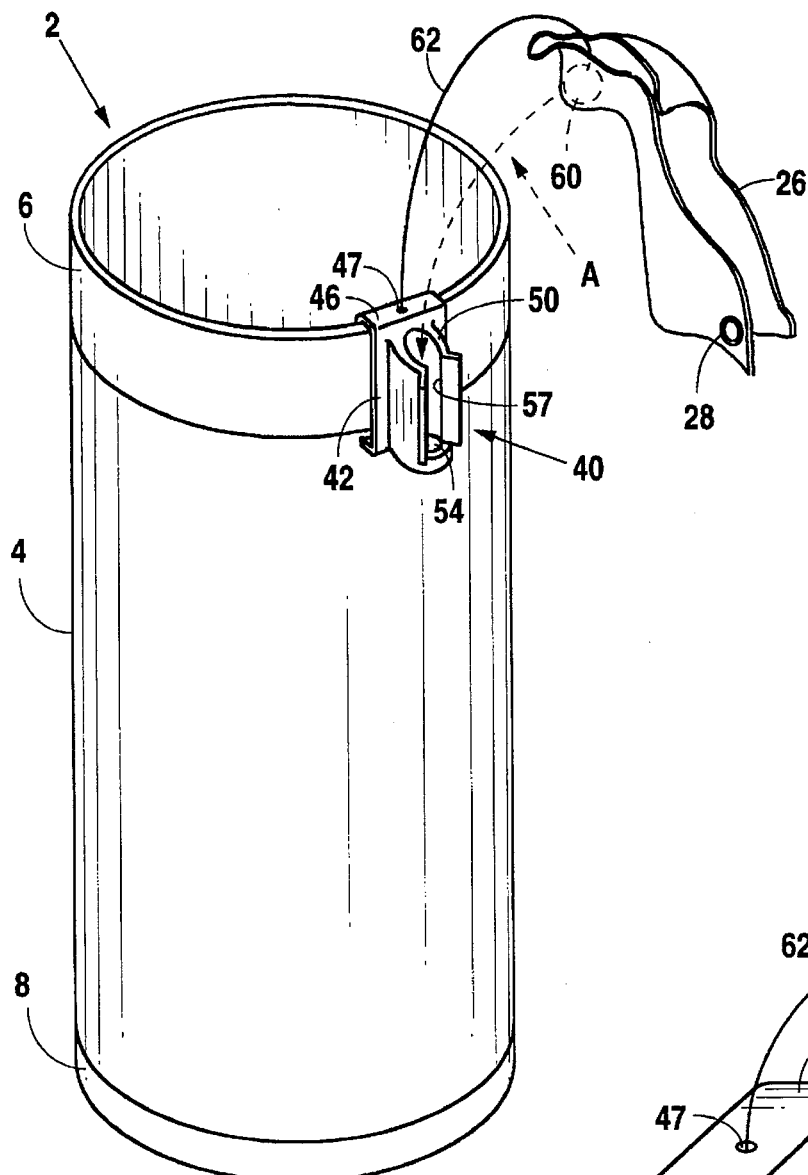
FIG. 2 is a perspective view of an embodiment of the attachment apparatus of the present invention for securing a pliable material, e.g., a golf towel, with a rigid structure, e.g., a golf bag.

Referring now to FIG. 2, the golf bag 2 having an embodiment of the towel attachment apparatus 40 of the present invention is shown. This golf bag 2 is identical to the golf bag 2 of FIG. 1, however, the upper rim 6 of the bag 2 is here shown larger than in FIG. 2 for purposes of illustrating the towel attachment apparatus 40. As with the golf bag 2 shown in FIG. 1, the golf bag 2 of FIG. 2 includes a shell 4 and lower rim 8. Although not shown in FIG. 2, the golf bag 2 also includes all features illustrated in connection with the golf bag of FIG. 1.

Still referring to FIG. 2, the embodiment of the towel attachment apparatus 40 shown here is a clip-on type. Generally, such clip-on type of the apparatus 40 clips on the upper rim 6 of the golf bag 2 by passing on either side of the rim 6 and attaching therewith. Generally, the apparatus 40 includes a body 42. With the body 42 is incorporated a cylindrical container 50. The cylindrical container 50 may include an expansion slot 57. The cylindrical container 50 may also include a bottom 54. Along the body 42 may be located a wire hole 47 in which is affixed a wire 62 which is connected with a ball 60. The wire 62 serves to retain the ball 60 with the apparatus 40.

Continuing to refer to FIG. 2, the apparatus 40 operates by engaging a towel 26 (which may or may not have a grommet 28) within the cylindrical container 50. As is shown by dotted arrow A, the towel 26 is wrapped partially around the ball 60 and the ball 60 and towel 26 are forced into the cylindrical container 50 to contact the bottom 54. The ball 60 and the portion of the towel 26 wrapped around the ball 60 are then contained within the cylindrical container 50. The remainder of the towel 26 is free to pass through the expansion slot 57 of the cylindrical container 50 and to hang free. The towel 26 is held in place by the apparatus 40 due to the frictional forces exerted on the towel 26 between the ball 60 and the wall of the cylindrical container 50 when the ball 60 and towel 26 are in place therein. As can be readily appreciated, this arrangement provides a much stronger attachment of the towel 26 with the golf bag 2 than obtained with the prior technology. The location along the towel 26 at which the ball 60 is wrapped may be varied; therefore, wear of the towel 26 in the location of its attachment with the golf bag 2 is reduced. Further, a greater surface area of the towel 26 is contacted with the apparatus 40, thus, assuring a better attachment and greater strength of that attachment. To remove the towel 26 from attachment with the bag 2, the towel 26 and ball 60 are slid upward within the cylindrical container 50 until the ball 60 and towel 26 exit the top of the container 50.

Figure 3:
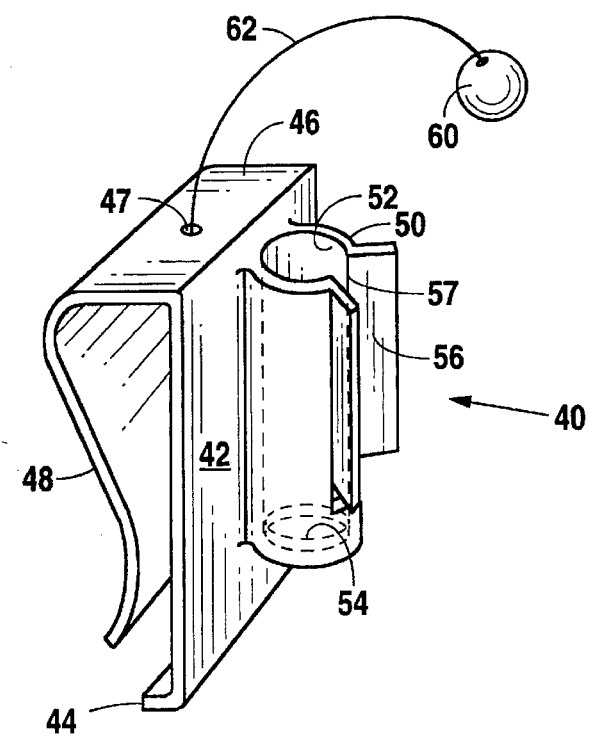
FIG. 3 is a detailed, perspective view of the embodiment of the attachment apparatus of FIG. 2, in which the attachment mechanism is a clip compatible with a rigid structure for securement therewith.

Now referring to FIG. 3, a detailed illustration of an embodiment of the towel attachment apparatus 40 of the present invention, identical to that shown in FIG. 2, may be described. As previously mentioned, the towel attachment apparatus 40 includes a body 42 with a cylindrical container 50 extension. The body 42 of the apparatus 40 includes a rim catch 44 which serves to catch below an upper rim 6 (see FIG. 2) of a golf bag 2 to maintain the apparatus 40 in place therewith. The body 42 also includes a top 46 and a clamp back 48. The top 46 rides the top of the upper rim 6 of the bag 2 and the clamp back 48 clamps the body 42 against the upper rim 6 to prevent the apparatus 40 from moving circumferentially therealong. The body 42 may be incorporated with a wire hole 47 at the top 46 of the body 42, as previously mentioned. Such a wire hole 47 serves to maintain a wire 62 which may be attached to a ball 60. The wire hole 47 and wire 62 arrangement is optional, as the general operation of the invention is not altered thereby. The wire 62 may, however, be advantageous in that it serves to maintain the ball 60 with the bag 2 to prevent loss thereof.

Still referring to FIG. 3, the body 42, as mentioned, is incorporated with a cylindrical container 50. The cylindrical container 50 has a bore hole 52 of diameter sufficient for accepting the ball 60 when a towel 26 (not shown in FIG. 3, but shown in FIG. 2) is wrapped therearound and the ball 60 and towel 26 are inserted therein. The cylindrical container 50 is formed with a longitudinal expansion slot 57 along the outer face of the container 50. This expansion slot 57 may be a longitudinal slit in the wall of the container 50. The expansion slot 57 serves to allow the bore hole 52 of the cylindrical container 50 to expand in diameter as the ball 60 with towel 26 is jammed into the bore hole 52. The cylindrical container 50 may, along the perimeter of the expansion slot 57, include fins 56. Fins 56 may serve to direct the towel 26 as it protrudes through the expansion slot 57, thereby maintaining the towel 26 in a relatively defined area as it hangs from the apparatus 40. The cylindrical container 50 may also include a bottom 54 at the lower end of the container 50 below the expansion slot 57. The bottom 54 serves to maintain the ball 60 and towel 26 from falling through the lower end of the cylindrical container 50.

Figure 4:
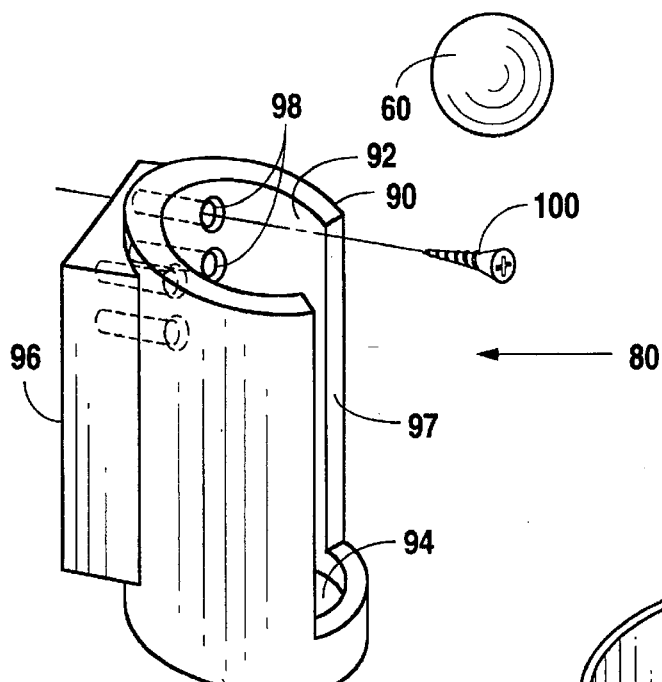
FIG. 4 is a detailed, perspective view of an alternative embodiment of the attachment apparatus of FIG. 3, in which the attachment mechanism is screws.

Next referring to FIG. 4, an alternative embodiment of the towel attachment apparatus 80 is shown. In this embodiment of the apparatus 80, the apparatus includes a body 96 which includes several, such as, for example, four, screwholes 98. The screwholes 98 pass from within the bore hole 92 of the cylindrical container 90 incorporated as part of the body 96, and through the body 96 out the back side of the apparatus 80. The cylindrical container 90 is similar to that of the other embodiment shown in FIG. 3, except that the container 90 does not, in this particular example, include fins 56 (as shown in FIG. 3). The cylindrical container 90 does, however, include an expansion slot 97, extending longitudinally in the cylindrical container 90 wall. The cylindrical container 90 also includes at its lower end a bottom 94 which serves the same purpose previously described. With this embodiment of the apparatus 80, screws 100 are employed to mount the apparatus 90 on a golf bag 2 (not shown in FIG. 4, but shown in FIG. 2) or other structure.

Still referring to FIG. 4, the embodiment of the towel attachment apparatus 80 is mounted with a rigid structure, such as the golf bag 2 at its upper rim 6 (shown in FIG. 2), by screws 100 which pass through the screwholes 98 of the body 96. A variety of configurations and numbers of screwholes 98 and screws 100 may be employed as necessary or desirable to secure adequate attachment of the apparatus 80. In the exemplary embodiment shown in FIG. 4, four screwholes 98 are employed with four screws 100. A variety of screw types and other fastening mechanisms may be utilized in mounting the apparatus 80, including, for example, screws, nuts and bolts, staples, rivets, and others. Alternatively, the apparatus 80 can be mounted by a suitable cementing substance, by melting, or by some other known means of attachment. In any event, the attachment should be sufficient to maintain the apparatus 80 in place with a rigid structure, such as a golf bag 2, when utilized for maintaining a pliable material, such as a towel 26, as has been described. Although a ball 60 is not shown in place within the bore hole 92 of the apparatus 80 in FIG. 4, a ball 60 utilized with a towel 26 in the manner previously described is also pertinent to and appropriate for the particular embodiment.

Figure 5:
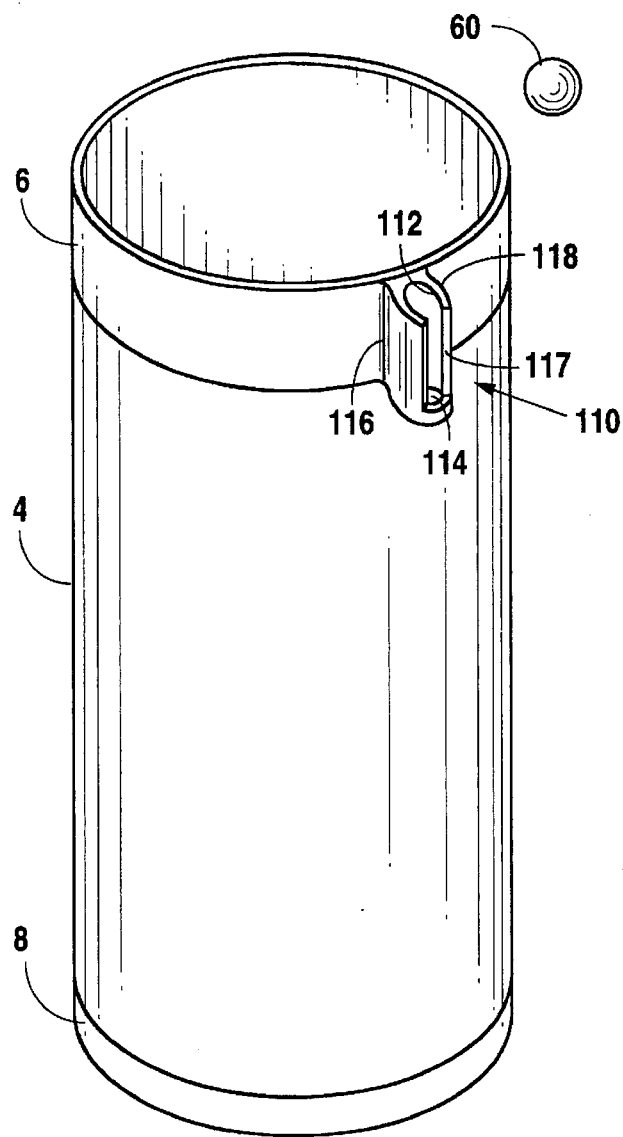
FIG. 5 is a detailed, perspective view of another alternative embodiment of the attachment apparatus of FIGS. 2–3, in which the attachment mechanism is formed as a part of a rigid structure, e.g., a golf bag.

Now referring to FIG. 5, another alternative embodiment of the towel attachment apparatus 110 is shown as employed with a golf bag 2. As with the golf bag 2 previously described, the golf bag 2 includes a shell 4 having an upper rim 6 and a lower rim 8. Again the upper rim 6 is enlarged for purposes of illustrating the towel attachment apparatus 110. In this instance the towel attachment apparatus 110 is incorporated with the golf bag 2 as part of the upper rim 6. As so incorporated, the apparatus 110 includes a body 116. The body is formed with a cylindrical container 118 having an inner bore hole 112. The cylindrical container 118 includes an expansion slot 117 and is formed with a bottom 114. Operation of this alternative embodiment of the apparatus 110 is similar to the operation previously described, in that a ball 60 is wrapped in a towel 26 and forced into the cylindrical container 118. In so forcing the ball 60 and towel 26 into the cylindrical container 118, frictional force is exerted against the bore hole 112 of the cylindrical container 118 due to the insertion of the ball 60 and the towel 26 disposed therebetween. This frictional engagement secures the towel 26 within the cylindrical container 118 until the ball 60 and towel 26 are forced upward within the cylindrical container 118 and out of the apparatus 110.

Now referring to FIGS. 2-5, in conjunction, operation of the towel attachment apparatus 40, 80, 110 may be better understood. Referring first to FIG. 2, the apparatus 40 includes a bore hole 57 within the cylindrical container 50. This bore hole is of sufficient diameter and length to accept a ball 60 around which is wrapped a pliable material, such as a towel 26. The cylindrical container 50 is, however, of diameter only slightly larger than the ball 60 but sufficient to accept the ball 60 with the towel 6 wrapped therearound in a tight fit. The ball 60 with towel 26 therearound is slid into the cylindrical container 50 through its bore hole 57 sufficient to engage the ball 60 and towel 26 in a grip within the container 50. Portions of the towel 26 then protrude through the expansion slot 57 and hang from the attachment apparatus 40 to allow use of the towel 26. The ball 60 is preferably wrapped with a corner or extension of the towel 26 so that a significant portion of the towel 26 is allowed to drop freely from the attachment apparatus 40 and to be usable in a manner in which such a towel 26 is typically employed.

Now referring to FIGS. 3-5, in respective sequence, each of the embodiments of the apparatus 40, 80, 110 functions in a similar manner to the apparatus 40 described in connection with FIG. 2. That is, a ball 60 of slightly smaller diameter than the diameter of the bore hole 57, 97, 117 of the cylindrical container 50, 90, 118 is wrapped with the towel 26 and forced into the bore hole 57, 97, 117 of the container 50, 90, 118 to wedge the ball 60 and towel 26 therein, with a usable portion of the towel 26 extending through the expansion slot 57, 97, 117 and allowed to wave freely. The primary differences in the various embodiments of the apparatus 40, 80, 110 are the method and means for attachment of the respective apparatus 40, 80, 110 with a rigid structure, such as a golf bag 2 (shown in FIG. 2).

Referring again to FIGS. 2-5, in conjunction, the ball 60 employed with the apparatus 40, 80, 110 may be of a variety of forms. For example, the ball 60 may be attached with the wire 62 as shown in FIGS. 2–3 for retention of the ball 60 with the apparatus as shown in FIGS. 2–3 or the ball 60 may be free of attachment as shown in FIGS. 4–5. The attachment and non-attachment of the ball 60 shown in FIGS. 2–5 is intended as exemplary of the two possibilities that may apply to any particular apparatus 40, 80, 110. Furthermore, the ball 60 may be of varied size or even shape. For example, the ball 60 may be quite small, on the order of about one-quarter inch or one-half inch in diameter, or the ball may be large, on the order of about one inch in diameter or more. In fact, the ball 60 could be a standard golf ball. If a standard golf ball is employed as the ball 60, the golf ball may serve as a readily available substitute in the event of loss of the player's golf ball during play. Alternatively, the ball 60 could be something other than a spherical form. For example, the ball 60 could be a triangular or square piece which fits similarly to snug with a towel 26 within the cylindrical container 50, 90, 118 of the apparatus 40, 80, 110. In the instance of a shape that is not a sphere as the ball 60, the container 50, 90, 118 of the apparatus 40, 80, 110 may be more suitably shaped with a square or triangular or other-shaped bore. As is apparent, numerous shapes, sizes, and possibilities may be appropriate in accordance with the principles of the invention.

Continuing still to refer to FIGS. 2–5, in conjunction, the mechanism or means for attachment of the apparatus 40, 80, 110 with the rigid structure, such as, for example, a golf bag 2, may vary from the particular exemplary embodiments shown. For example, any suitable binding mechanism would be appropriate for attaching a body 42, 96, 116 of an apparatus 40, 80, 110 with such structure. Adhesives, staples, fastening tape, such as Velcro ™, rivets, and numerous other mechanisms and substances could be appropriate in a particular instance. The three possibilities illustrated in detail in the figures, i.e., a clip 48, screws 100, and incorporation with a rigid piece, shown in FIGS. 3–5, respectively, are merely exemplary and other possibilities may be appropriate in each instance all in keeping with the principles of the present invention. Further, the shape and dimensions of the apparatus 40, 80, 110 may vary widely. The apparatus 40, 80, 110 may be longer, shorter, thicker, wider, or otherwise varied, and the numerous other variations of dimensions, as well as the numerous and various possibilities for the configuration of the cylindrical container 50, 90, 118 of the apparatus 40, 80, 110 are all intended to be included in the invention.

Further still referring to FIGS. 2–5, in conjunction, other possible alternatives for the apparatus 40, 80, 110, and, in particular, the cylindrical container 50, 90, 118 are to provide the container 50, 90, 118 with internally-disposed ridges or other friction-inducing surfaces. Such ridges or surfaces may serve to better retain a ball 60 wrapped in a towel 26 when forced into the bore 57, 97, 117 of the container 50, 90, 118. Even further, the cylindrical container 50, 90, 118 may be shaped in a variety of manners to facilitate the engagement; for example, the cylindrical container 50, 90, 118 could have a frusto-conical bore in which the ball 60 with towel 26 is disposed or a variety of the numerous other structural shape possibilities. In any event, the objective in utilizing such other shape and design would depend upon the desired degree of engagement necessary for the application and other design considerations, such as, for example, economics and application.

Still continuing to refer to FIGS. 2–5, in conjunction, the towel attachment apparatus 40, 80, 110 may be formed of a wide variety of materials. Plastics appear to be a desirable substance for constructing the entire apparatus 40, 80, 110 and/or parts thereof. Additionally or alternatively, however, the apparatus 40, 80, 110 may be constructed of other materials, such as metal, wood, composite, and other substances. The particular substance in any event will be dictated in large part by traditional design considerations for similar products. In manufacturing the apparatus 40, 80, 110, a suitable process means includes injection molding of the entire apparatus 40, 80, 110, particularly when all or part of the apparatus 40, 80, 110 is formed of a plastic or other similarly formable substance. Alternatively, the apparatus 40, 80, 110 could be machined or carved or otherwise formed. Further, manufacture could include all or combinations of any of those methods.

Continuing to refer to FIGS. 2–5, in conjunction, as has been mentioned, the present invention, and the embodiments thereof particularly described herein, may have varied application. Though the particular embodiments of the towel attachment apparatus 40, 80, 110 have been described with respect to use as a golf towel 26 attachment mechanism for a golf bag 2, the apparatus 40, 80, 110, and variants, modifications, and alternatives thereof, may be suitable in any other instance in which a pliable material or cloth must be attached with and retained by a mechanism suitable for joining with a rigid structure. Other possible applications for the invention include retaining tarps, erecting or enclosing tents, plastic sheeting maintenance, and numerous and varied other applications.

Based upon the forgoing, those skilled in the art will fully understand and appreciate the advantages exhibited by the teachings herein. Those skilled in the art will also understand and appreciate that various alternatives, additions, variants and modifications may be made in embodiments and, in particular, the preferred embodiment described herein. The foregoing detailed description is, thus, to be clearly understood as being given by way of illustration and example only, the spirit and scope of the present invention being limited solely by the appended claims.

What is claimed is:

1. An apparatus for securing, comprising:

a cylindrical container having a cylindrical internal bore of an inside diameter; and a partially wrapped ball, of smaller diameter than said inside diameter, wedged into said internal bore;

wherein said container includes a circumferentially disposed expansion slot extending longitudinally along said container; and wherein said container terminates in a bottom which plugs said internal bore preventing longitudinal passage of said partially wrapped ball entirely through said internal bore of said container.

* * * * *